United States Patent
Jung et al.

(10) Patent No.: US 11,307,893 B2
(45) Date of Patent: Apr. 19, 2022

(54) PIPELINING FOR STEP INPUT DATASET AND OUTPUT DATASET

(71) Applicant: TMAXSOFT CO., LTD, Gyeonggi-do (KR)

(72) Inventors: Wooseok Jung, Gyeonggi-do (KR); Eungkyu Lee, Gyeonggi-do (KR)

(73) Assignee: TMAXSOFT CO., LTD., Gyeonggi-do (KR)

( * ) Notice: Subject to any disclaimer, the term of this patent is extended or adjusted under 35 U.S.C. 154(b) by 106 days.

(21) Appl. No.: 16/832,287

(22) Filed: Mar. 27, 2020

(65) Prior Publication Data

US 2021/0303341 A1 Sep. 30, 2021

(30) Foreign Application Priority Data

Mar. 25, 2020 (KR) .................. 10-2020-0036274

(51) Int. Cl.
*G06F 9/44* (2018.01)
*G06F 8/40* (2018.01)
(Continued)

(52) U.S. Cl.
CPC .......... *G06F 9/4881* (2013.01); *G06F 9/3836* (2013.01); *G06F 9/3867* (2013.01); *G06F 16/906* (2019.01); *G06F 8/427* (2013.01)

(58) Field of Classification Search
CPC .... G06F 9/4881; G06F 9/3836; G06F 9/3867; G06F 9/54; G06F 9/522; G06F 9/524; G06F 8/37; G06F 8/427; G06F 8/433; G06F 8/445; G06F 8/4451; G06F 8/4452; G06F 8/456; G06F 8/457; G06F 8/458; G06F 16/906

USPC ......... 718/102–108; 712/216–219, 245, 248; 717/119, 121, 143, 145, 146, 154, 155, 717/156; 708/102–108

See application file for complete search history.

(56) References Cited

U.S. PATENT DOCUMENTS

| | | | |
|---|---|---|---|
| 4,868,744 A * | 9/1989 | Reinsch | G06F 11/141 714/19 |
| 5,459,866 A * | 10/1995 | Akiba | G06F 8/10 712/201 |

(Continued)

FOREIGN PATENT DOCUMENTS

| | | | |
|---|---|---|---|
| JP | 2019197533 A | 11/2019 | |
| KR | 1020060032009 A | 4/2006 | |

*Primary Examiner* — Daniel H Pan
(74) *Attorney, Agent, or Firm* — Umberg Zipser LLP; Ryan Dean

(57) ABSTRACT

According to an exemplary embodiment of the present disclosure, a computer program stored in a computer readable storage medium is disclosed. The computer program includes instructions which cause a processor to execute steps, the steps including: classifying a first group and a second group by executing static analysis to a code including plural steps stated in Job Control Language (JCL), the first group including one or more steps where pipelining is available, the second group including one or more steps where pipelining is unavailable; determining a sequential or parallel execution of the plural steps based on a classification result; and transferring an output data of a first step to an input stream of a second step based on an order of steps included in the first group when processing steps included in the first group among the plural steps.

6 Claims, 6 Drawing Sheets

(51) Int. Cl.
*G06F 16/906* (2019.01)
*G06F 9/48* (2006.01)
*G06F 9/38* (2018.01)
*G06F 8/41* (2018.01)

(56) References Cited

U.S. PATENT DOCUMENTS

| | | | |
|---|---|---|---|
| 6,292,885 B1* | 9/2001 | Nakai | G06F 11/3404 |
| | | | 712/219 |
| 2008/0229314 A1* | 9/2008 | Hirose | G06F 9/5038 |
| | | | 718/102 |
| 2015/0160934 A1* | 6/2015 | Beit-Aharon | G06F 8/51 |
| | | | 717/137 |

* cited by examiner

PIPELINING FOR STEP INPUT DATASET AND OUTPUT DATASET

CROSS-REFERENCE TO RELATED APPLICATIONS

This application claims priority to and the benefit of Korean Patent Application No. 10-2020-0036274 filed in the Korean Intellectual Property Office on Mar. 25, 2020, the entire contents of which are incorporated herein by reference.

TECHNICAL FIELD

The present disclosure relates to Job Control Language (JCL) step processing, and more particularly, to pipelining two steps when an output dataset of one step is identical to an input dataset of another step.

BACKGROUND ART

A Job Control Language (JCL) is a script language used in an IBM main frame operating system, and instructs the system how to perform batch processing operations or start subsystems.

A process of processing JCL steps in an open frame in the related art may be a sequential repetition of operations of reading an input dataset existing in a DB or in the form of a file, processing the read input dataset through a program stated in a step, and then writing an output dataset in the DB or in the form of a file.

In this case, the input/output datasets are required for all programs processing extract, Transform, Load (ETL), so that read/write processing per step necessarily occurs at least once. Accordingly, file Input/Output (I/O) processing costs may be high in an execution process of the JCL steps.

Accordingly, in the art, there may be a demand for a technology that reduces the file I/O cost when executing the JCL steps.

SUMMARY OF THE INVENTION

The present disclosure is conceived in response to the background art, and has been made in an effort to provide parallel processing of a plurality of Job Control Language (JCL) steps.

The technical objects of the present disclosure are not limited to the foregoing technical objects, and other non-mentioned technical objects will be clearly understood by those skilled in the art from the description below.

According to an exemplary embodiment of the present disclosure for achieving the object, a computer program stored in a computer readable storage medium is disclosed. The computer program stored in the computer readable storage medium includes instructions which cause a processor to execute steps, the steps including: classifying a first group and a second group by executing static analysis to a code including plural steps stated in the Job Control Language (JCL) code, the first group including one or more steps where pipelining is available, the second group including one or more steps where pipelining is unavailable; determining a sequential or parallel execution of the plural steps based on a classification result; and transferring an output data of a first step to an input stream of a second step based on an order of steps included in the first group when processing steps included in the first group among the plural steps.

The classifying the first group and the second group may include: recognizing the first step and the second step, in which an output dataset of the first step is identical to an input dataset of the second step among the plurality of steps; and adding the first step and the second step to the first group.

The recognizing the first step and the second step may include classifying one or more datasets included in the code to an input dataset or an output dataset.

The classifying the one or more datasets to the input dataset or the output dataset may include: recognizing a type of program included in the code; when the type of program is a system utility program, recognizing an input DD name and an output DD name of the system utility program based on predetermined system utility program DD name information; and classifying the one or more datasets to the input dataset related to the input DD name and the output dataset related to the output DD name.

The classifying the one or more datasets to the input dataset or the output dataset may include: recognizing a type of program included in the code; and when the type of program included in the JCL is a user program, classifying the one or more datasets to the input dataset for the user program and the output dataset for the user program by executing static analysis to the code of the user program.

The classifying the one or more datasets to the input dataset and the output dataset by executing the static analysis to the user program may include: recognizing an input DD name and an output DD name by using code information on the code stored in a database, the code information being generated by parsing the code; and classifying the input dataset related to the input DD name associated with the user program or the output dataset related to the output DD name associated with the user program by using information related to the user program among the code information.

According to another exemplary embodiment of the present disclosure for achieving the object, a computing device for pipelining JCL step input and output datasets is disclosed. The computing device may include: a processor; and a memory, in which the processor classifies a first group and a second group by executing static analysis to a code including plural steps stated in Job Control Language (JCL) code, the first group including one or more steps where pipelining is available, the second group including one or more steps where pipelining is unavailable; determines a sequential or parallel execution of the plural steps based on a classification result; and transfers an output data of a first step to an input stream of a second step based on an order of the plural steps.

The processor may recognize the first step and the second step, in which an output dataset of the first step is identical to an input dataset of the second step among the plurality of steps; and adds the first step and the second step to the first group.

For the recognizing the first step and the second step, the processor may classify one or more datasets included in the code to an input dataset or an output dataset.

For the classifying the one or more datasets to the input dataset or the output dataset, the processor may recognize a type of program included in the code, and when the type of program is a system utility program, the processor may recognize an input DD name and an output DD name of the system utility program based on predetermined system utility program DD name information, and classify the one or more datasets to the input dataset related to the input DD name and the output dataset related to the output DD name.

For the classifying the one or more datasets to the input dataset or the output dataset, the processor may recognize a type of program included in the code, and when the type of program included in the JCL code is a user program, the processor may classify the one or more datasets to the input dataset for the user program and the output dataset for the user program by executing static analysis to the code of the user program.

The processor may recognize an input DD name and an output DD name by using code information on the code stored in a database, the code information being generated by parsing the code, and classify the input dataset related to the input DD name associated with the user program or the output dataset related to the output DD name associated with the user program by using information related to the user program among the code information.

The technical solutions obtainable from the present disclosure are not limited to the foregoing solutions, and other non-mentioned solution will be clearly understood by those skilled in the art from the description below.

The present disclosure provides a method of pipelining step input and output datasets, thereby enabling the plurality of steps included in a job to be more rapidly processed.

The effects obtainable from the present disclosure are not limited to the foregoing effects, and other non-mentioned effects will be clearly understood by those skilled in the art from the description below.

BRIEF DESCRIPTION OF THE DRAWINGS

Various aspects are described with reference to the drawings, and herein, like reference numerals are generally used to designate like constituent elements. In the exemplary embodiment below, for the purpose of description, a plurality of specific and detailed matters is suggested in order to provide general understanding of one or more aspects. However, it is apparent that the aspect(s) may be carried out without the specific and detailed matters.

DETAILED DESCRIPTION

Figure 1:
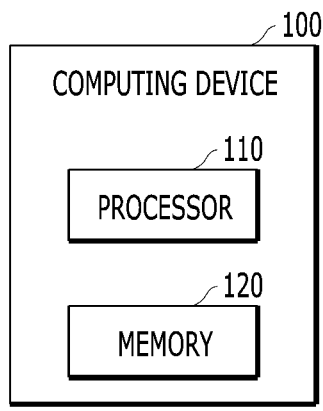
FIG. 1 is a block diagram illustrating a configuration of a computing device for performing a method of pipelining step input and output datasets according to the present disclosure.

Various exemplary embodiments and/or aspects are now disclosed with reference to the drawings. In the description below, the plurality of particular detailed matters are disclosed for helping general understanding of one or more aspects for the purpose of description. However, the point that the aspect(s) is executable even without the particular detailed matters may also be recognized by those skilled in the art. The subsequent description and the accompanying drawings describe specific illustrative aspects of one or more aspects in detail. However, the aspects are illustrative, and some of the various methods of various aspects of the principles may be used, and the descriptions intend to include the aspects and the equivalents thereof. Particularly, an "exemplary embodiment" an "example", an "aspect" an "illustration" and the like used in the present specification may not be construed to be better or have an advantage compared to a predetermined described aspect, an aspect having a different design, or designs.

Hereinafter, the same or similar constituent element is denoted by the same reference numeral regardless of a reference numeral, and a repeated description thereof will be omitted. Further, in describing the exemplary embodiment disclosed in the present disclosure, when it is determined that detailed description relating to well-known functions or configurations may make the subject matter of the exemplary embodiment disclosed in the present disclosure ambiguous, the detailed description will be omitted. Further, the accompanying drawings are provided only for helping to easily understand exemplary embodiments disclosed in the present specification, and the technical spirit disclosed in the present specification is not limited by the accompanying drawings.

A term used in the present specification is for describing the exemplary embodiments, and does not intend to limit the present disclosure. In the present specification, a singular form includes a plural form as well, unless otherwise mentioned. A term "comprises" and/or "comprising" used in the specification does not exclude the existence or an addition of one or more other constituent elements, in addition to the mentioned constituent element.

Although "a first", "a second", and the like are used for describing various elements or constituent elements, but the elements or the constituent elements are not limited by the terms. The terms are used for discriminating one element or constituent element from another element or constituent element. Accordingly, a first element or constituent element mentioned below may also be a second element or constituent element within the technical spirit of the present disclosure as a matter of course.

Unless otherwise defined, all of the terms (including technical and scientific terms) used in the present specification may be used as a meaning commonly understandable by those skilled in the art. Further, terms defined in a generally used dictionary shall not be construed as being ideal or excessive in meaning unless they are clearly defined.

A term "or" intends to mean comprehensive "or" not exclusive "or". That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

Terms "information" and "data" used in the present specification may be frequently used to be exchangeable with each other.

Hereinafter, the same or similar constituent element is denoted by the same reference numeral regardless of a reference numeral, and a repeated description thereof will be omitted. Further, in describing the exemplary embodiment disclosed in the present disclosure, when it is determined that detailed description relating to well-known functions or configurations may make the subject matter of the exemplary embodiment disclosed in the present disclosure ambiguous, the detailed description will be omitted. Further, the accompanying drawings are provided for only helping to easily understand exemplary embodiments disclosed in the present specification, and the technical spirit disclosed in the present specification is not limited by the accompanying drawings.

Although "a first", "a second", and the like are used for describing various elements or constituent elements, but the elements or the constituent elements are not limited by the terms. The terms are used for discriminating one element or constituent element from another element or constituent element. Accordingly, a first element or constituent element mentioned below may also be a second element or constituent element within the technical spirit of the present disclosure as a matter of course.

Unless otherwise defined, all of the terms (including technical and scientific terms) used in the present specification may be used as a meaning commonly understandable by those skilled in the art. Further, terms defined in a generally used dictionary shall not be construed as being ideal or excessive in meaning unless they are clearly defined.

Suffixes, "module" and "unit" for a constituent element used for the description below are given or mixed in consideration of only easiness of the writing of the specification, and the suffix itself does not have a discriminated meaning or role.

An object and an effect of the present disclosure, and technical configurations for achieving them will be apparent when the exemplary embodiments, which are described below in detail together with the accompanying drawing, are referred. In the description of the present disclosure, when a detailed description of a related publicly known function or configuration is determined to unnecessarily make the subject matter of the present disclosure unclear, the detailed description will be omitted. Further, terms described below are terms defined in consideration of a function in the present disclosure, and may be changed according to an intention of a user and an operator or a usual practice.

However, the present disclosure is not limited to the exemplary embodiments disclosed below, and may be implemented in various different forms. However, the present exemplary embodiments are provided to make the present disclosure complete and to completely transfer the scope of the disclosure to those skilled in the art, and the present disclosure is simply defined by the claims. Accordingly, the definitions thereof should be made based on the entire contents of the present specification.

FIG. 1 is a block diagram illustrating a computing device according to the exemplary embodiments of the present disclosure.

As illustrated in FIG. 1, a computing device 100 may include a processor 110, a memory 120, and a communication unit (not illustrated). However, the foregoing constituent elements are not essential for implementing the computing device 100, so that the computing device 100 may include more or less constituent elements than the above listed constituent elements.

The processor 110 may be formed of one or more cores, and may include a predetermined form of processor, such as a Central Processing Unit (CPU), a General Purpose Graphics Processing Unit (GPGPU), and a Tensor Processing Unit (TPU) of the computing device, for pipelining step input and output datasets by executing commands stored in a memory.

The processor 110 may pipeline step input and output datasets according to the exemplary embodiments of the present disclosure by reading a computer program stored in the memory. The processor 110 may control general operations of the components of the computing device 100 for pipelining step input and output datasets.

The communication unit (not illustrated) may include a wired/wireless Internet module for the network access. The communication unit (not illustrated) may communicate with other computing devices. As the wireless Internet technology, a wireless local area network (WLAN, Wi-Fi), a wireless broadband (Wibro), world interoperability for microwave access (Wimax), and high speed downlink packet access (HSDPA), and the like may be used. As the wired Internet technology, a digital subscriber line (XDSL), fibers to the home (FTTH), power line communication (PLC), and the like may be used.

The foregoing components are illustrative, so that the scope of the present disclosure is not limited by the foregoing components. That is, additional components may be included or some of the foregoing components may be omitted according to an implementation aspect for the exemplary embodiments of the present disclosure.

The computing device 100 may further include the memory 120. The memory may store a program for an operation of the processor 110, and may also temporarily or persistently store input/output data. The memory may include at least one type of storage medium among a flash memory type, a hard disk type, a multimedia card micro type, and the card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. The memory may be operated under the control of the processor.

Figure 2:
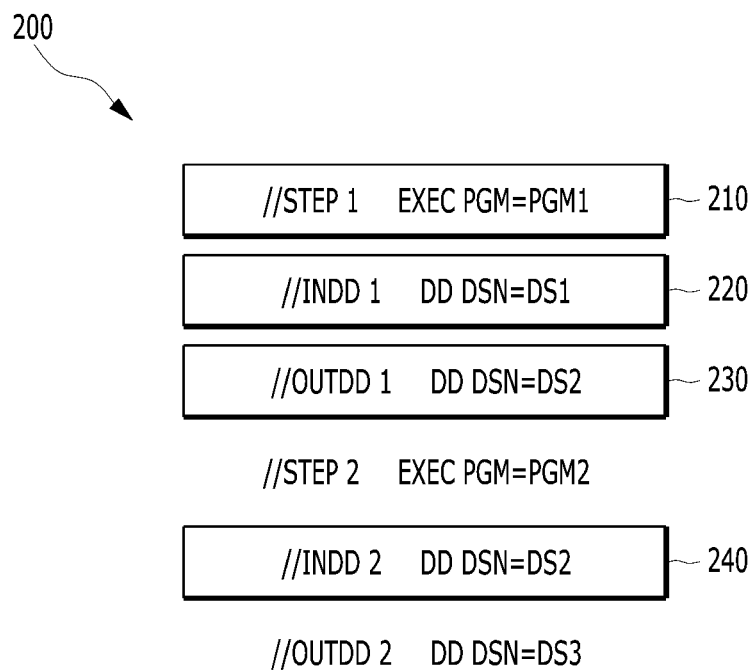
FIG. 2 is a diagram illustrating an example of a code stated in Job Control Language (JCL) for performing the method of pipelining step input and output datasets according to the present disclosure.

FIG. 2 is a diagram illustrating an example of a code stated in Job Control Language (JCL) for performing the method of pipelining step input and output datasets according to the present disclosure.

In the present disclosure, the pipelining means connecting an output of data processing executed in one step to an input of a next step. In the connected steps, multiple steps may be performed simultaneously or in parallel, so that a job may be efficiently performed.

For example, in one job including multiple steps, when an output dataset of a first step is identical to an input dataset of a second step, the first step and the second step may be pipelined by the processor 110.

For example, the processor 110 according to the present disclosure may perform the pipelining by transferring the output data of the first step to an input stream of the second step.

Referring to FIG. 2, the processor 110 may sequentially execute a code (hereinafter, the code) 200 stated in the JCL.

The code 200 illustrated in FIG. 2 may include a first step call command 210, a first dataset input command 220, a dataset output command 230, and a second dataset input command 240.

The commands illustrated in FIG. 2 may be a part of the commands executable through the code 200, and the commands executable through the code 200 are not limited thereto.

The processor 110 according to the exemplary embodiments of the present disclosure may call the first step included in the job through the first step call command 210.

One step may include an execution procedure for one or more programs, and the program may read an input dataset and generate an output dataset that is an outcome of the processing.

Herein, the first step may include an execution procedure for a program named "PGM1" and may be called by the first step call command 210 and executed.

In the present disclosure, DD is an abbreviation of Data Description, and the code 200 may include a data file used in the step and a DD statement for identifying detailed information about the corresponding file.

The processor 110 according to the exemplary embodiments of the present disclosure may read an input dataset for the program included in the first step called through the first step call command 210. The procedure of reading the input dataset is executed through the first dataset input command 220.

Referring to FIG. 2, the processor 110 may read a dataset having a name of "DS1" as the input dataset through the DD name of "INDD1".

The processor 110 according to the exemplary embodiments of the present disclosure may generate an output dataset that is an outcome of the processing by the program included in the first step called through the first step call command 210. The process of generating the output dataset may be a process of writing output data that is the processing result of the program in the memory.

The procedure of generating the output dataset is executed through the dataset output command 230.

Referring to FIG. 2, the processor 110 may generate a dataset having a name of "DS2" as the output dataset through the DD name of "OUTDD1".

Accordingly, the processor 110 may generate the output dataset of "DS2" as the processing outcome of the program included in the first step.

Referring back to FIG. 2, for example, the DD name of the first dataset input command 220 may be INDD1, and the DD name of the dataset output command 230 may be OUTDD1. Accordingly, an input DD name of the program "PGM1" illustrated in FIG. 2 may be INDD1 and an output DD name of the program "PGM1" may be OUTDD1.

The dataset associated with the input DD name in the first dataset input command 220 may be "DS1", which may be the input dataset for the program "PGM1". The dataset associated with the output DD name in the first dataset output command 230 may be "DS2", which may be the output dataset for the program "PGM1".

As described above, the job may include one or more steps. Referring to FIG. 2, the processor 110 according to the exemplary embodiments of the present disclosure may read the input dataset for the program included in the second step called through the second step call command. The procedure of reading the input dataset is executed through the second dataset input command 240.

The processor 110 may read the input dataset having the dataset name of "DS2".

FIG. 2 illustrates the case where the output dataset in the first step is identical to the input dataset in the second step.

In the foregoing example, the processor 110 according to the present disclosure may determine whether the input dataset is identical to the output dataset by using a result of the determination on whether the name (Dataset Name (DSN)) of the output dataset in the first step is identical to the name of the input dataset in the second step. The use of the result of the determination on whether the dataset names are identical is merely an example of the determination on whether the datasets are identical, so that the method of determining whether the datasets are identical is not limited thereto.

In this case, the processor 110 may pipeline pipelining the first step and the second step by transferring the output data of the first step to the input stream of the second step.

Figure 3A:
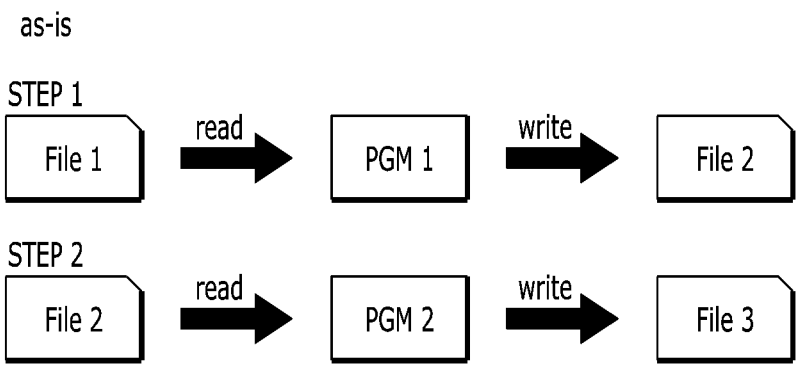
FIG. 3A is a diagram illustrating an example of a process of processing a plurality of steps according to the related art.

FIG. 3A is a diagram illustrating an example of a process of processing a plurality of steps according to the related art.

Referring to FIG. 3A, the processor 110 may generate the output dataset by reading the input dataset for the program in the first step included in the job and then writing the output dataset corresponding to the read input dataset in the memory.

The processor 110 may read the generated output dataset for the program included in the second step and generate an output dataset corresponding to the read output dataset in the memory.

According to the process illustrated in FIG. 3A, the processor needs to go through at least one reading process and one writing process per step.

Figure 3B:
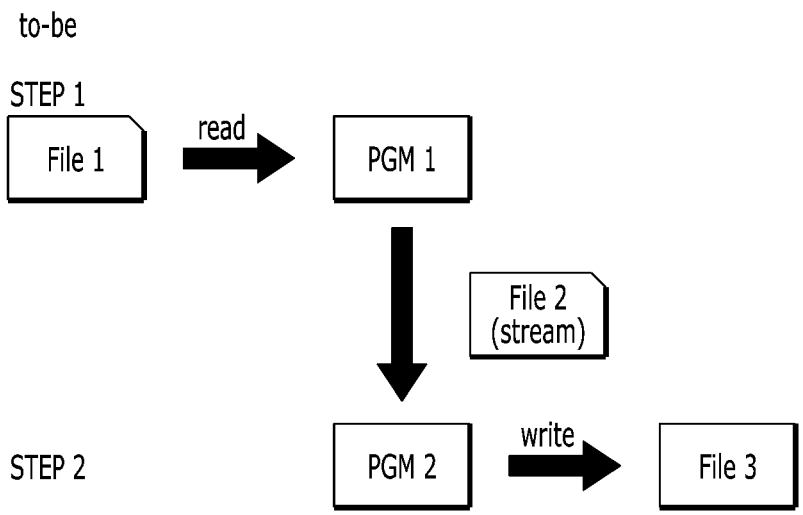
FIG. 3B is a diagram illustrating an example of a process of processing a plurality of steps when the method of pipelining step input and output datasets according to the present disclosure is applied.

FIG. 3B is a diagram illustrating an example of a process of processing a plurality of steps when the method of pipelining step input and output datasets according to the present disclosure is applied.

Referring to FIG. 3B, the processor 110 reads an input dataset for the program in the first step included in the job and then directly transfers output data corresponding to the read input dataset to an input stream of the program of the second step.

Accordingly, the processor 110 goes through only one reading process and one writing process to process the two steps included in the job.

That is, the plurality of steps in which the pipelining is executed may demand only one reading and one writing. Accordingly, when the pipelining is performed, the I/O the processing costs of the file may be greatly reduced.

Figure 4:
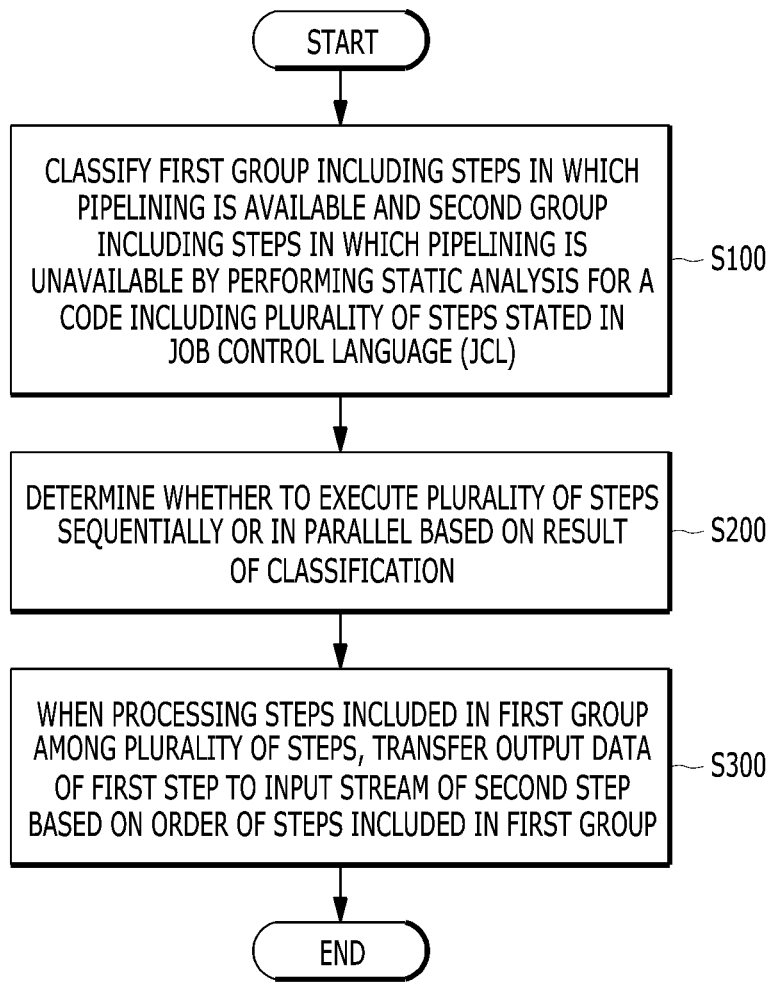
FIG. 4 is a flowchart illustrating an example of a process of performing, by a processor, the method of pipelining step input and output datasets according to exemplary embodiments of the present disclosure.

FIG. 4 is a flowchart illustrating an example of a process of performing, by a processor, the method of pipelining step input and output datasets according to exemplary embodiments of the present disclosure.

Referring to FIG. 4, the processor 110 may classify a first group including steps in which pipelining is available and a second group including steps in which pipelining is unavailable by performing static analysis for a code including the plurality of steps stated in the JCL (S100).

The static analysis (or the static program analysis, hereinafter, referred to as the "static analysis") refers to the analysis of computer software without actual execution.

In the present disclosure, the processor 110 needs to check information on an input dataset and an output dataset of the steps included in a job for pipelining the plurality of steps.

The processor 110 may store code information on the code including the plurality of steps stated in the JCL stating the job in a database and then classify the steps in which the pipelining is available and the steps in which the pipelining is unavailable by using the stored code information.

The processor 110 may classify the steps, in which the pipelining is available, among the classified steps, to a first group, and the steps, in which the pipelining is unavailable, to a second group.

In the present disclosure, the pipelining means connecting an output of data processing executed in one step to an input of a next step. In the connected steps, multiple steps may be performed simultaneously or in parallel, so that a job may be efficiently performed.

In the present disclosure, one or more first groups may be present, and the steps, in which the pipelining is available, may not be all grouped into one group.

For example, when the first step and the second step may be pipelined and a third step and a fourth step may be pipelined, the first group may include each of a group of the first step and the second step and a group of the third step and the fourth step.

In the present disclosure, the second group may include the steps, in which the pipelining is determined not to be available by the processor 110.

In the meantime, the processor 110 may determine whether to execute the plurality of steps sequentially or in parallel based on a result of the classification in operation S100 (S200).

Particularly, the processor 110 may determine to process the steps, in which the pipelining is available, included in the first step in parallel. This is because the step positioned at a lower priority among the pipelined steps does not need to wait for the step positioned at a higher priority to end. The processor 110 may determine to sequentially execute other steps.

For example, it is assumed that the first step to the fourth step are included in the job, and the pipelining of the second step and the third step is available.

The processor 110 may determine to process the second step and the third step in parallel. Further, the processor 110 may determine to sequentially process the first step and the second step, and also determine to sequentially process the third step and the fourth step.

As described above, in the case where the processor 110 determines to process the steps, where the pipelining is available, in parallel, a total processing time required for processing one job by the processor 110 may be decreased.

In the meantime, when the processor 110 processes the steps included in the first group among the plurality of steps, the processor 110 may transfer output data of the first step to an input stream of the second step based on the order of the steps included in the first group (S300).

The input/output may be defined as transmission/reception of data between an internal/external device of a computer and a program. In the present disclosure, the input stream may be defined as a sort of channel that connects two targets and transmits data in order to transfer data from one target to another target.

In the present disclosure, for the plurality of steps included in the first group, in which the pipelining is determined to be available, the processor 110 may transfer output data of the step positioned at a higher priority to an input stream of the step positioned at a lower priority. Accordingly, a process of writing the output data for storing the output data in the memory in the form of a separate file may be omitted, thereby reducing costs for inputting/outputting the file.

Figure 5:
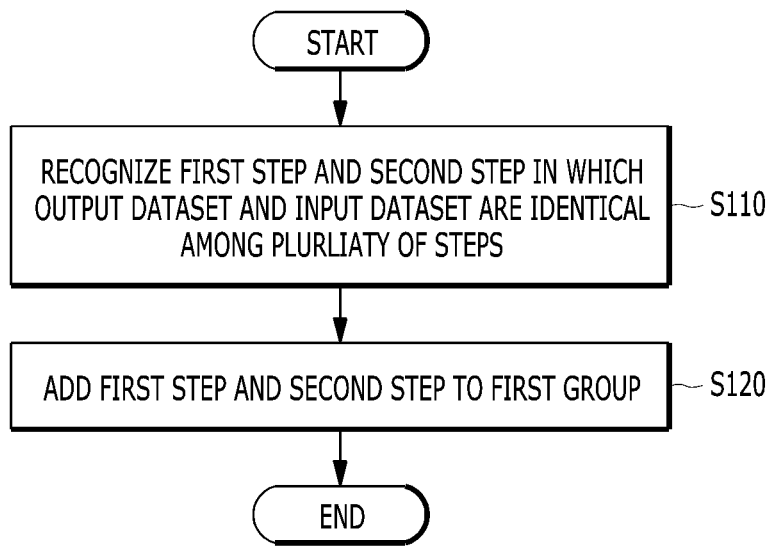
FIG. 5 is a flowchart illustrating an example of a process of classifying, by the processor, a first group including steps where pipelining is available, and a second group including steps where pipelining is unavailable, according to exemplary embodiments of the present disclosure.

FIG. 5 is a flowchart illustrating an example of a process of classifying, by the processor, the first group including the steps where pipelining is available, and the second group including the steps where pipelining is unavailable, according to exemplary embodiments of the present disclosure.

Referring to FIG. 5, the processor 110 may recognize the first step and the second step, in which an output dataset and an input dataset are identical, among the plurality of steps (S110).

In the present disclosure, the pipelining means connecting an output of data processing executed in one step to an input of a next step. In the connected steps, multiple steps may be performed simultaneously or in parallel, so that a job may be efficiently performed.

In the present disclosure, DD is an abbreviation of Data Description, and the code 200 may include a data file used in the step and a DD statement for identifying detailed information about the corresponding file.

Referring back to FIG. 2, the DD name of the first dataset input command 220 may be INDD1, and the DD name of the dataset output command 230 may be OUTDD1. Accordingly, the input DD name of the program "PGM1" illustrated in FIG. 2 may be INDD1 and the output DD name of the program "PGM1" may be OUTDD1.

The dataset associated with the input DD name in the first dataset input command 220 may be "DS1" which may be the input dataset for the program "PGM1". The dataset associated with the output DD name in the dataset output command 230 may be "DS2", which may be the output dataset for the program "PGM1".

In the meantime, the processor 110 may analyze the input DD name and the output DD name included in each of the plurality of steps.

For example, the processor 110 may recognize the input DD name and the output DD name of the step included in the job by performing the static analysis. Further, the processor 110 may recognize the input DD name and the output DD name by performing the static analysis on the input dataset associated with the input DD name and the output dataset associated with the output DD name. The processor 110 may recognize the steps, in which the pipelining is available, by comparing the stored input dataset and output dataset.

Herein, an input dataset of any one step among the steps, in which the pipelining is available, may be identical to an output dataset of another step.

In the foregoing example, the processor 110 according to the present disclosure may determine whether the input dataset is identical to the output dataset by using a result of the determination on whether the name (Dataset Name (DSN)) of the output dataset is identical to the name of the input dataset. The use of the result of the determination on whether the dataset names are identical is merely an example of the determination on whether the datasets are identical, so that the method of determining whether the datasets are identical is not limited thereto.

For example, the processor 110 may recognize the input DD name and the output DD name of each of the first step and the second step stated in the code 200. The processor 110 may recognize the datasets associated with the input DD name and the output DD name of each of the first step and the second step. For example, when the output dataset associated with the output DD name of the first step is identical to the input dataset associated with the input DD name of the second step, the processor 110 may pipeline the first step and the second step.

The execution of the pipelining by using the DD name is merely illustrative, and the method of executing the pipelining is not limited thereto.

Referring back to FIG. 5, the processor 110 may add the first step and the second step to the first group (S120).

In the present disclosure, one or more first groups may be present, and the steps, in which the pipelining is available, may not be all grouped into one group.

For example, when the first step and the second step may be pipelined and a third step and a fourth step may be pipelined, the first group may include each of a group of the first step and the second step and a group of the third step and the fourth step.

Figure 6:
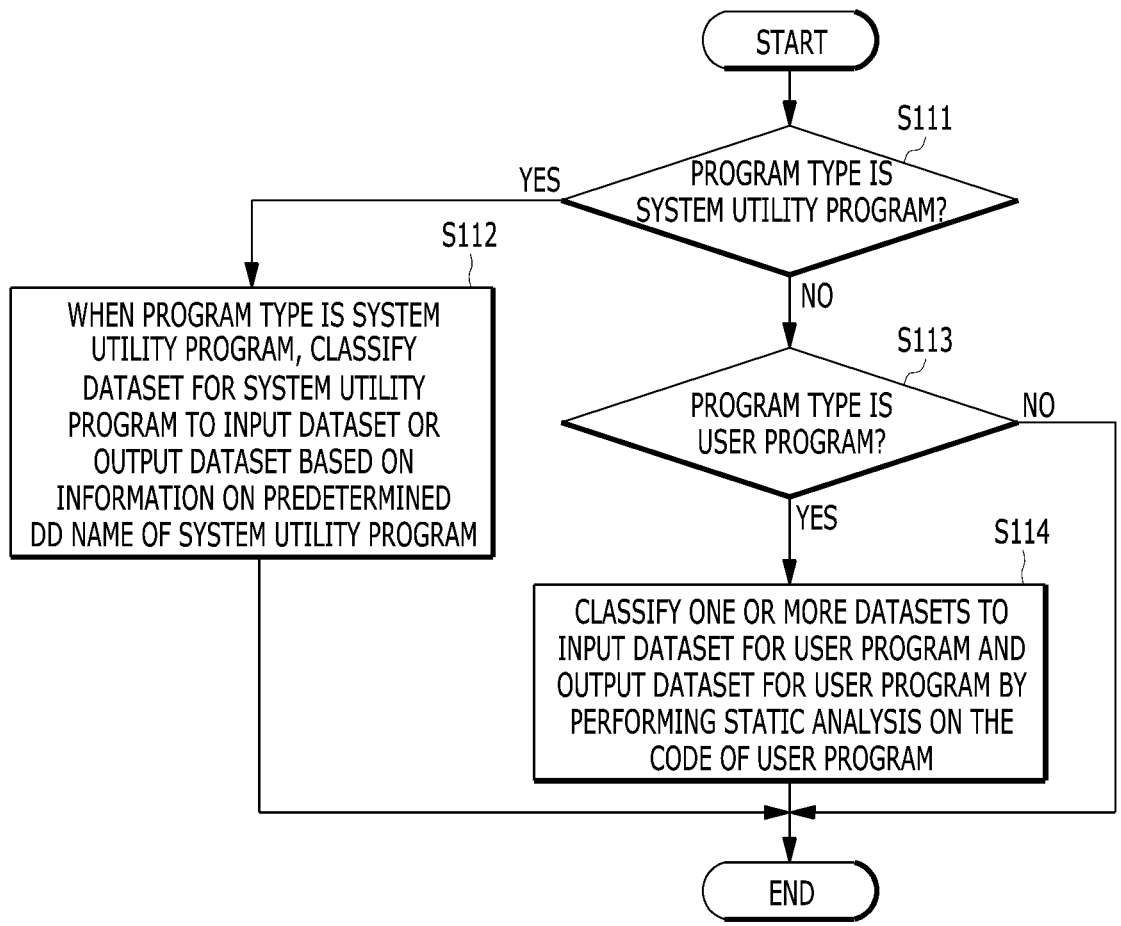
FIG. 6 is a flowchart illustrating an example of a process of recognizing, by the processor, a first step and a second step, in which an output dataset and an input dataset are identical, among the plurality of steps according to exemplary embodiments of the present disclosure.

FIG. 6 is a flowchart illustrating an example of a process of recognizing, by the processor, the first step and the second step, in which the output dataset and the input dataset are identical, among the plurality of steps according to exemplary embodiments of the present disclosure.

Referring to FIG. 6, the processor 110 may recognize whether a program type is a system utility program (S111).

In the present disclosure, the system utility program may mean a program provided by an operating system that helps to build a convenient environment for the development and the execution of known programs.

In the present disclosure, the system utility program may be the program in which an input DD name and an output DD name are determined in advance.

When the program type is the system utility program (YES in S111), the processor 110 may classify a dataset for the system utility program to an input dataset or an output dataset based on information on the predetermined DD name of the system utility program (S112).

Particularly, in the present disclosure, the input DD name and the output DD name of the system utility program may be determined in advance. Accordingly, the processor 110 may recognize the input DD name and the output DD name of the system utility program without a separate analysis on whether the DD name is for input or output. Then, the processor 110 may classify one or more datasets to the input dataset or the output dataset by using the recognized input DD name and output DD name.

In the foregoing example, the processor 110 according to the present disclosure may determine whether the input dataset is identical to the output dataset by using a result of the determination on whether the name (Dataset Name (DSN)) of the output dataset is identical to the name of the input dataset. The use of the result of the determination on whether the dataset names are identical is merely an example of the determination on whether the datasets are identical, so that the method of determining whether the datasets are identical is not limited thereto.

In the meantime, when the program type is not the system utility program (NO in S111), the processor 110 may recognize whether the program type is a user program (S113).

In the exemplary embodiments of the pipelining method according to the present disclosure, the user program may be the program separately defined by a user, other than the system utility program.

Accordingly, in this case, the input DD name and the output DD name of the user program may not be determined in advance. Accordingly, the processor 110 needs to recognize the input DD name and the output DD name based on the static analysis of the COBOL code.

When the program type is the user program (YES in S113), the processor 110 may classify one or more datasets to an input dataset for the user program and an output dataset for the user program by performing the static analysis on the code of the user program (S114).

The static analysis (or the static program analysis, hereinafter, referred to as the "static analysis") refers to the analysis of computer software without actual execution.

In the present disclosure, the processor 110 needs to check information on an input dataset and an output dataset of the steps included in a job for pipelining the plurality of steps.

The processor 110 may store code information on the code including the plurality of steps stated in JCL in the database and then classify the input dataset and the output dataset. The processor 110 may classify the steps where the pipelining is available and the steps in which the pipelining is unavailable by comparing the classified input dataset and output dataset. This will be described in detail below with reference to FIG. 7.

Figure 7:
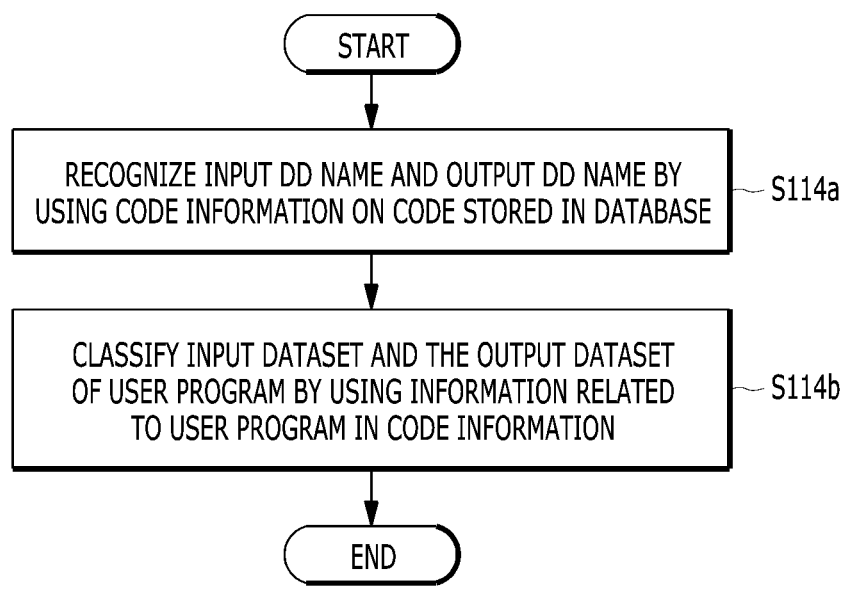
FIG. 7 is a flowchart illustrating an example of a process of classifying, by the processor, an input dataset and an output dataset for a user program by executing static analysis for a JCL code according to exemplary embodiments of the present disclosure.

FIG. 7 is a flowchart illustrating an example of a process of classifying, by the processor, the input dataset and the output dataset for the user program by executing static analysis to a JCL code according to exemplary embodiments of the present disclosure.

Referring to FIG. 7, the processor 110 may recognize the input DD name and the output DD name by using the code information on the code stored in the database (S114*a*).

In the present disclosure, the code information may be the information stored in the database after parsing the code 200.

In the present disclosure, the parsing may be defined as a process of decomposing a series of character strings to meaningful tokens and building a parse tree of the tokens.

The processor 110 may classify the input dataset and the output dataset of the user program by using the information related to the user program in the code information (S114*b*).

The processor 110 may classify the input dataset and the output dataset by using the code information parsed and stored in the database.

For example, the processor 110 may recognize the input DD name associated with the user program and the dataset associated with the input DD name and the output DD name and the dataset associated with the output DD name in the first step. The processor 110 may classify the dataset associated with the input DD name to the input dataset and the dataset associated with the output DD name to the output dataset.

The processor 110 may find the case where the input dataset is identical to the output dataset by analyzing the classified input dataset and output dataset. The processor 110 may recognize the steps related to each of the identical input dataset and output dataset. The processor 110 may classify the recognized steps to the steps where the pipelining is available. Then, the processor 110 may process the classified steps in parallel.

In the foregoing example, the processor 110 according to the present disclosure may determine whether the input dataset is identical to the output dataset by using a result of the determination on whether the name (Dataset Name (DSN)) of the output dataset is identical to the name of the input dataset. The use of the result of the determination on whether the dataset names are identical is merely an example of the determination on whether the datasets are identical, so that the method of determining whether the datasets are identical is not limited thereto.

The processor 110 may determine to process the steps where the pipelining is available included in the first group in parallel. This is because the step positioned at a lower priority among the pipelined steps does not need to wait for the step positioned at a higher priority to end. The processor 110 may determine to sequentially execute other steps.

By the foregoing method, the processor 110 may classify the steps where the pipelining is available among the plurality of steps. Accordingly, it is possible to reduce the file input/output cost and increase the entire performance speed of the job by the parallel processing.

Figure 8:
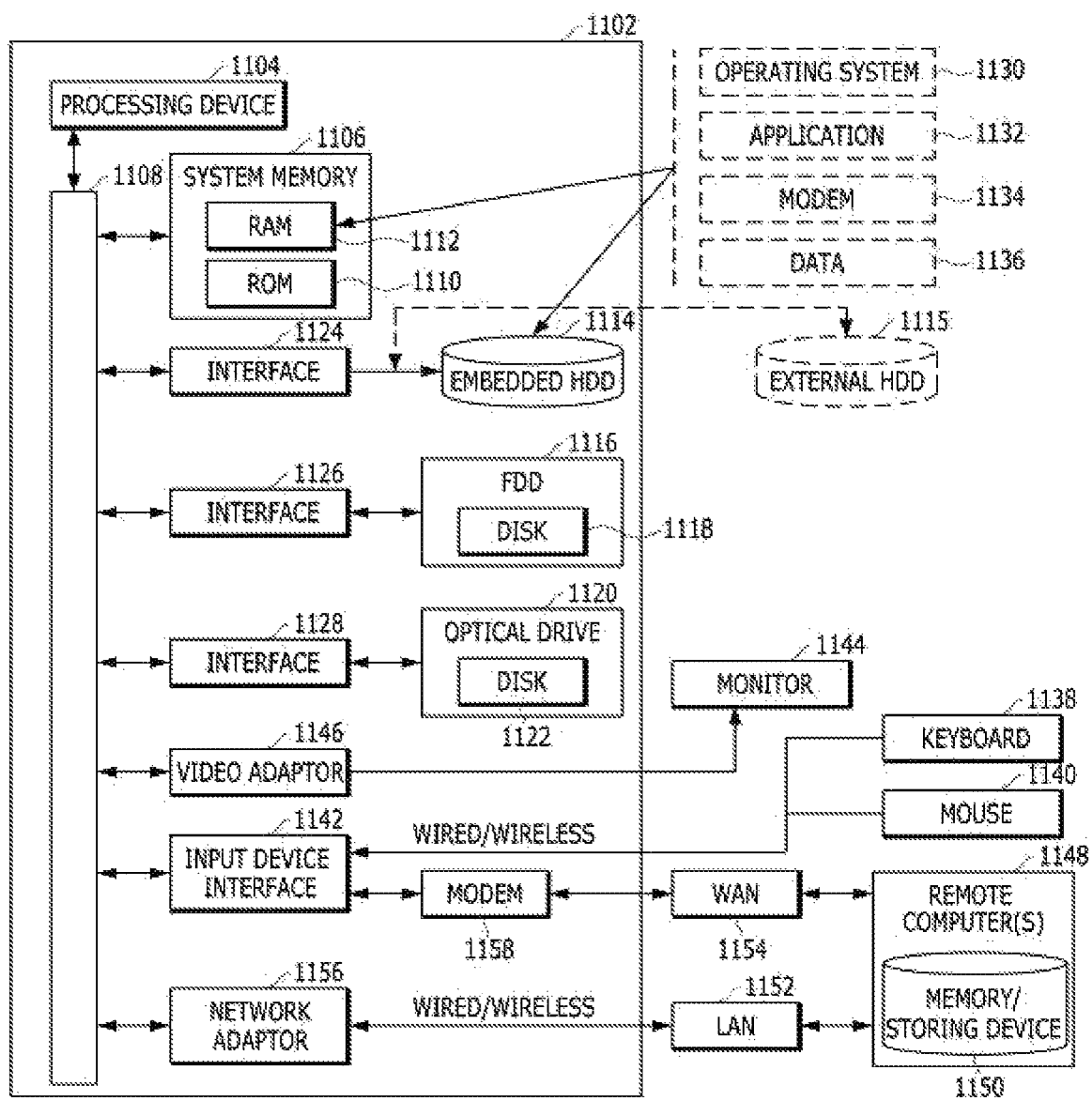
FIG. 8 is a simple and general schematic diagram illustrating an example of a computing environment in which the exemplary embodiments of the present disclosure are implementable.

FIG. 8 is a simple and general schematic diagram illustrating an example of a computing environment in which the exemplary embodiments of the present disclosure are implementable.

A computer illustrated in FIG. 8 may correspond to at least one of the computing devices included in a computing device 100.

The present disclosure has been generally described in relation to a computer executable command executable in one or more computers, but those skilled in the art will appreciate that the present disclosure is combined with other program modules and/or be implemented by a combination of hardware and software.

In general, a module in the present specification includes a routine, a procedure, a program, a component, a data structure, and the like performing a specific task or implementing a specific abstract data form. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be positioned in both a local memory storage device and a remote memory storage device.

The computer generally includes various computer readable media. The computer readable medium is a computer accessible medium, and includes volatile and non-volatile media, transitory and non-transitory media, and portable and non-portable media. As a non-limited example, the computer readable medium may include a computer readable storage medium and a computer readable transmission medium.

The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a Random Access Memory (RAM), a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium implements a computer readable command, a data structure, a program module, or other data in a modulated data signal, such as a carrier wave or other transport mechanisms, and generally includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, radio frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various common processors. A dual processor and other multiprocessor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an erasable and programmable ROM (EPROM), and an EEPROM, and the BIOS includes a basic routine helping a transport of information among the constituent elements within the computer 1102 at a specific time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA)) —the embedded HDD 1114 being configured for outer mounted usage within a proper chassis (not illustrated) —a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of predetermined data in an appropriate digital form. In the description of the computer readable storage media, the HDD, the portable magnetic disk, and the portable optical media, such as a CD, or a DVD, are mentioned, but those skilled in the art will appreciate well that other types of compute readable storage media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be appreciated well that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a server computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication server on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art will appreciate that the various illustrative logical blocks, modules, processors, means, circuits, and algorithm operations described in relation to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. A term "machine-readable medium" includes a wireless channel and various other media, which are capable of storing, holding, and/or transporting a command(s) and/or data, but is not limited thereto.

It shall be understood that a specific order or a hierarchical structure of the operations included in the presented processes is an example of illustrative accesses. It shall be understood that a specific order or a hierarchical structure of the operations included in the processes may be re-arranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics suggested herein.

What is claimed is:

1. A non-transitory computer-readable medium containing a computer program, wherein the computer program includes instructions which cause a processor to execute steps, the steps comprising:
    classifying a first group and a second group by executing static analysis to a code including plural steps stated in JCL (Job Control Language) code,
    determining a sequential or parallel execution of the plural steps based on a classification result, and
    transferring an output data of a first step to an input stream of a second step based on an order of steps included in the first group when processing steps included in the first group among the plural steps,
    wherein the first group includes one or more steps where pipelining is available,
    wherein the second group includes one or more steps where pipelining is unavailable,
    wherein the classifying the first group and the second group comprises:
        recognizing the first step and the second step, and
        adding the first step and the second step to the first group,
        wherein an output dataset of the first step and an input dataset of the second step is identical,
    wherein the recognizing the first step and the second step comprises:
        classifying one or more data sets included in the input data set or the output data set comprises:
        recognizing a type of a program included in the JCL code, and
        when the type of the program is a user program, classifying the one or more data sets to the input data set for the user program or the output data set for the user program by executing static analysis to the JCL code for the user program.

2. The non-transitory computer-readable medium of claim 1, wherein classifying one or more data sets in the JCL code to input data set or output data set comprises:
    recognizing a type of program included in the JCL code,
    when the type of the program is a system utility program, recognizing an input DD (Data Description) name and an output DD name of the system utility program based on predetermined system utility program DD name information, and
    classifying the one or more data set to the input data set related to the input DD name or the output data set related to the output DD name.

3. The non-transitory computer-readable medium of claim 1, wherein classifying the input data set and the output dataset by executing static analysis comprises:
    recognizing an input DD name and an output DD name based on the JCL code information stored in a database, and
    classifying the input data set related to the input DD name associated with the user program or the output data set related to the output DD name associated with the user program using user program-related information among the JCL code information,
    wherein the JCL code information is generated by parsing the JCL code.

4. A computing device for JCL step input and output data set pipelining comprising:
    a processor; and
    a memory;
    wherein the processor classifies a first group and a second group by executing static analysis including plural steps stated in JCL,
    determines sequential or parallel execution of the plural steps based on classification result, and
    transferring an output data of a first step to an input stream of a second step based on an order of steps included in the first group when processing steps included in the first group among the plural steps, and
    wherein the first group includes one or more steps where pipelining is available, and
    wherein the second group includes one or more steps where pipelining is unavailable,
    wherein the processor recognizes the first step and the second step and adds the first step and the second step to the first group, and
    wherein an output data of the first step and an input data of the second step is identical,
    wherein the processor classifies one or more data sets included in the JCL code to an input data set or an output data set,
    wherein the processor recognizes a type of a program included in the JCL code to classify the one or more data set to the input data set or the output data set, and
    classifies the one or more data sets to the input data set for the user program or the output data set for the user program by executing static analysis to the JCL code for user program when the type of the program is the user program.

5. The computing device for JCL step input and output data set pipelining of claim 4, wherein the processor recognizes the type of program included in the JCL code,
    when the type of the program is a system utility program, recognizes an input DD name and an output DD name of a system utility program based on the predetermined system utility program DD name information, and
    classifies the one or more data set into the input data set related to the input DD name or the output data set related to the output DD name.

6. The computing device for JCL step input and output data set pipelining of claim 4, wherein the processor recognizes an input DD name and an output DD name based on the JCL code information stored in a database, and
    classifies the input data set related to the input DD name associated with the user program or the output data set related to the output DD name associated with the user program using user program-related information among the JCL code information, and
    wherein the JCL code information is generated by parsing the JCL code.

* * * * *